United States Patent
Zhao et al.

(10) Patent No.: US 10,305,591 B2
(45) Date of Patent: May 28, 2019

(54) DETECTION APPARATUS AND METHOD FOR NOISE INTENSITY AND COHERENT OPTICAL RECEIVER

(71) Applicant: Fujitsu Limited, Kawasaki-shi, Kanagawa (JP)

(72) Inventors: Ying Zhao, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 5 days.

(21) Appl. No.: 15/664,420

(22) Filed: Jul. 31, 2017

(65) Prior Publication Data

US 2018/0069626 A1 Mar. 8, 2018

(30) Foreign Application Priority Data

Sep. 7, 2016 (CN) .......................... 2016 1 0806100

(51) Int. Cl.
*H04W 48/18* (2009.01)
*H04B 10/079* (2013.01)
*H04B 10/61* (2013.01)

(52) U.S. Cl.
CPC . *H04B 10/07955* (2013.01); *H04B 10/07953* (2013.01); *H04B 10/616* (2013.01); *H04B 10/6164* (2013.01); *H04B 10/6165* (2013.01); *H04B 2210/075* (2013.01)

(58) Field of Classification Search
CPC ........ H04B 10/07955; H04B 10/07953; H04B 10/616; H04B 10/6164; H04B 10/6165; H04B 2210/075; H04B 10/00; H04J 14/0227; H04J 14/0298; H04J 14/0221
See application file for complete search history.

(56) References Cited

U.S. PATENT DOCUMENTS

| | | | | |
|---|---|---|---|---|
| 2004/0165650 A1* | 8/2004 | Miyazaki | ............. | H04B 1/7097 375/141 |
| 2011/0033182 A1* | 2/2011 | Haunstein | ............. | H04B 10/60 398/26 |
| 2016/0277121 A1* | 9/2016 | Millar | ................ | H04B 10/6972 |

* cited by examiner

*Primary Examiner* — Ted M Wang
(74) *Attorney, Agent, or Firm* — Staas & Halsey LLP (57) ABSTRACT

A detection apparatus and method for noise intensity and a coherent optical receiver where the detection method includes: preprocessing a received signal to obtain a pilot sequence contained in the received signal; removing a phase noise of a receiving pilot sequence by using a known transmitting pilot signal; calculating a noise power density of the receiving pilot sequence with no (or without) phase noise within a predetermined spectral width near a pilot frequency; and calculating power of a linear noise of the received signal based on a bandwidth of the received signal and the noise power density within the predetermined spectral width. Hence, linear noises and nonlinear noises may be split efficiently without introducing much complexity, and information on intensities of various noises may be obtained.

13 Claims, 8 Drawing Sheets

DETECTION APPARATUS AND METHOD FOR NOISE INTENSITY AND COHERENT OPTICAL RECEIVER

CROSS-REFERENCE TO RELATED APPLICATIONS

This application claims the benefit of Chinese Application No. 201610806100.2, filed Sep. 7, 2016, in the Chinese Intellectual Property Office, the disclosure of which is incorporated herein by reference.

BACKGROUND

1. Field

This disclosure relates to the field of optical communications technologies, and in particular to a detection apparatus and method for noise intensity and a coherent optical receiver.

2. Description of the Related Art

In a coherent optical receiver, existence of noises causes transmission performance of a system to be limited. Noises introduced into signal transmission mainly include an amplified spontaneous emission (ASE) noise, a cross-phase modulation (XPM) noise of neighboring channels in a wavelength division multiplexing (WDM) transmission system, and a self-phase modulation (SPM) noise in transmission channels. Such three types of noises are different in physical mechanisms, their relative intensities are related to physical parameters, and influence experienced during transmission is dependent on a total contribution of the three types of noises.

An effective noise classification method and intensity monitoring method are important means for achieving system performance estimation and performance prediction. On the basis that noise classification is specified, quantitative analysis of noise intensity may optimize the system design, equalize the system resource, and improve the transmission performance. On the one hand, an accurate noise intensity monitoring method may be used in failure diagnosis and positioning of the system, so as to provide reliable information for network controlling units and monitor a network state in a real-time manner; and on the other hand, performance of the transmission system may be predicted, parameter selection and optimization may be directed, and a technical basis and method may be provided for network management and operation.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Additional aspects and/or advantages will be set forth in part in the description which follows and, in part, will be apparent from the description, or may be learned by practice of the embodiments.

Embodiments of this disclosure provide a detection apparatus and method for noise intensity and a coherent optical receiver. Digital signal processing (DSP) is performed in a coherent optical receiver, linear noises (such as ASE noises) and nonlinear noises (such as XPM noises) may be split efficiently without introducing much complexity, and information on intensities of various noises may be obtained.

According to a first aspect of the embodiments of this disclosure, there is provided a detection apparatus for noise intensity, configured in a coherent optical receiver, the detection apparatus including:

a signal preprocessing unit configured to preprocess a received signal to obtain a pilot sequence contained in the received signal;

a phase noise removing unit configured to remove a phase noise of a receiving pilot sequence by using a known transmitting pilot signal;

a power density calculating unit configured to calculate a noise power density of the receiving pilot sequence with no (or without) phase noise within a predetermined spectral width near a pilot frequency; and a linear noise calculating unit configured to calculate power of a linear noise of the received signal based on a bandwidth of the received signal and the noise power density within the predetermined spectral width.

According to a second aspect of the embodiments of this disclosure, there is provided a detection method for noise intensity, applicable a coherent optical receiver, the detection method including:

preprocessing a received signal to obtain a pilot sequence contained in the received signal;

removing a phase noise of a receiving pilot sequence by using a known transmitting pilot signal;

calculating a noise power density of the receiving pilot sequence with no phase noise within a predetermined spectral width near a pilot frequency; and calculating power of a linear noise of the received signal based on a bandwidth of the received signal and the noise power density within the predetermined spectral width.

According to a third aspect of the embodiments of this disclosure, there is provided a coherent optical receiver, including:

an optical-to-electrical converter configured to convert a received optical signal into an electrical signal; and a digital signal processor configured to preprocess the electrical signal to obtain a pilot sequence contained in the electrical signal, remove a phase noise of a receiving pilot sequence by using a known transmitting pilot signal, calculate a noise power density of the receiving pilot sequence with no phase noise within a predetermined spectral width near a pilot frequency, and calculate power of a linear noise of the received signal based on a bandwidth of the received signal and the noise power density within the predetermined spectral width.

An advantage of the embodiments of this disclosure exists in that in a transmitting device, a pilot sequence is added into the transmission signal, and in a receiving device, a phase noise of the pilot sequence in the received signal is removed, a noise power density of the pilot sequence with no phase noise within a predetermined spectral width near a pilot frequency is calculated, and power of a linear noise of the received signal is calculated based on a bandwidth of the received signal and the noise power density. Hence, linear noises and nonlinear noises may be split efficiently without introducing much complexity, and information on intensities of various noises may be obtained.

With reference to the following description and drawings, the particular embodiments of this disclosure are disclosed in detail, and the principle of this disclosure and the manners of use are indicated. It should be understood that the scope of the embodiments of this disclosure is not limited thereto.

The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Monitoring of noise intensity of a receiver is a basis for achieving transmission performance monitoring and prediction, and is also effective means for further optimizing transmission resource configuration of an optical network. During achievement of monitoring of noise intensity, no extra hardware overhead is desired to be introduced, hence, attention has been paid to a scheme in which monitoring of noise intensity is performed based on digital signal processing (DSP) in a coherent optical receiver. Based on performing signal processing in a coherent optical receiver, information on intensities of various noises may be obtained without introducing much complexity. This is a starting point of this application.

This application provides a scheme of noise classification and monitoring based on a pilot sequence, in which noises carried by a received pilot sequence is analyzed by using information of a coherent optical receiver, so as to achieve effective separation of, for example, an ASE noise and an XPM noise, and further respectively estimate intensities of various noises, and make definite judgment and indication on a state of the system. Effective data processing is not only a basis for carrying out a function of monitoring a noise intensity, but also advantageous to improvement of monitoring precision, thereby providing directions for production and function expansion of a coherent optical receiver.

Embodiments of this disclosure shall be described below in detail.

Embodiment 1

The embodiment of this disclosure provides a detection method for noise intensity, applicable to a coherent optical receiver.

Figure 1:
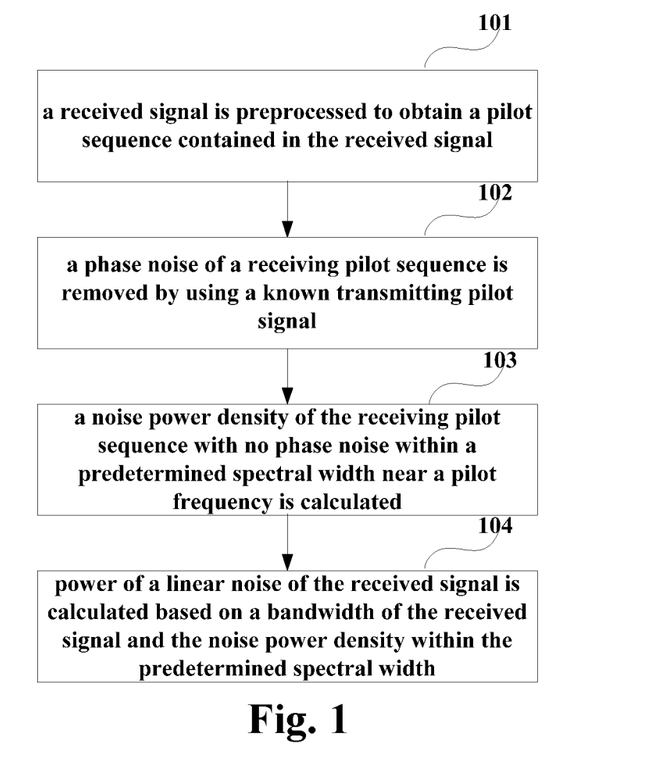
FIG. 1 is a flowchart of the detection method for noise intensity of Embodiment 1 of this disclosure.

FIG. 1 is a flowchart of the detection method for noise intensity of Embodiment 1 of this disclosure. As shown in FIG. 1, the detection method for noise intensity includes:

step 101: a received signal is preprocessed to obtain a pilot sequence contained in the received signal;

step 102: a phase noise of a receiving pilot sequence is removed by using a known transmitting pilot signal;

step 103: a noise power density of the receiving pilot sequence with no (or without) phase noise within a predetermined spectral width near a pilot frequency is calculated; and step 104: power of a linear noise of the received signal is calculated based on a bandwidth of the received signal and the noise power density within the predetermined spectral width.

In this embodiment, a pilot sequence may be added into a transmitting signal in a transmitting device. A structure of the pilot sequence is a basis for processing by a coherent optical receiver, and a special characteristic may be introduced into the pilot sequence taken as a known transmission sequence.

Figure 2:
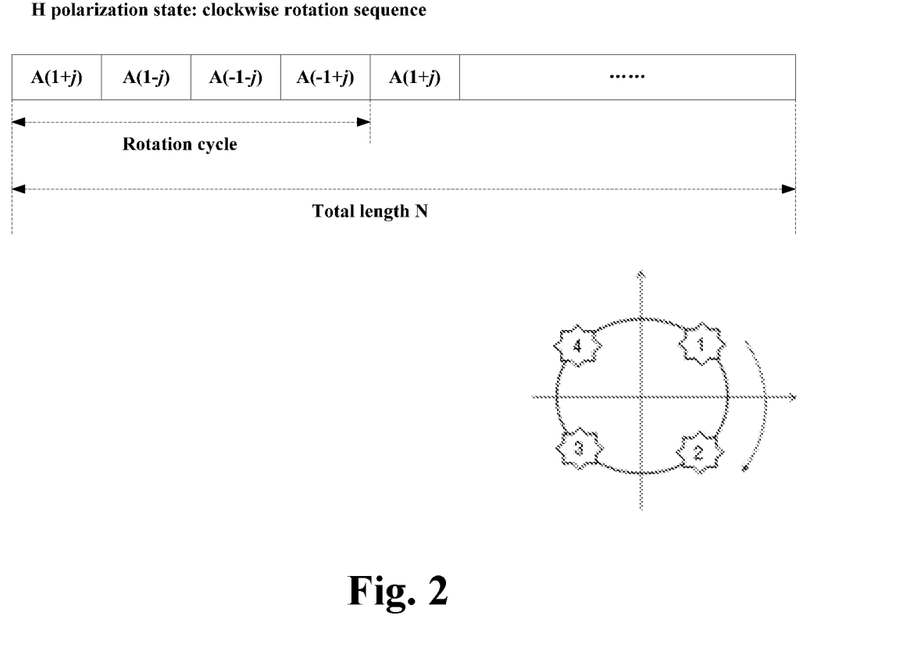
FIG. 2 is an exemplary diagram of a pilot sequence of Embodiment 1 of this disclosure.
Figure 3:
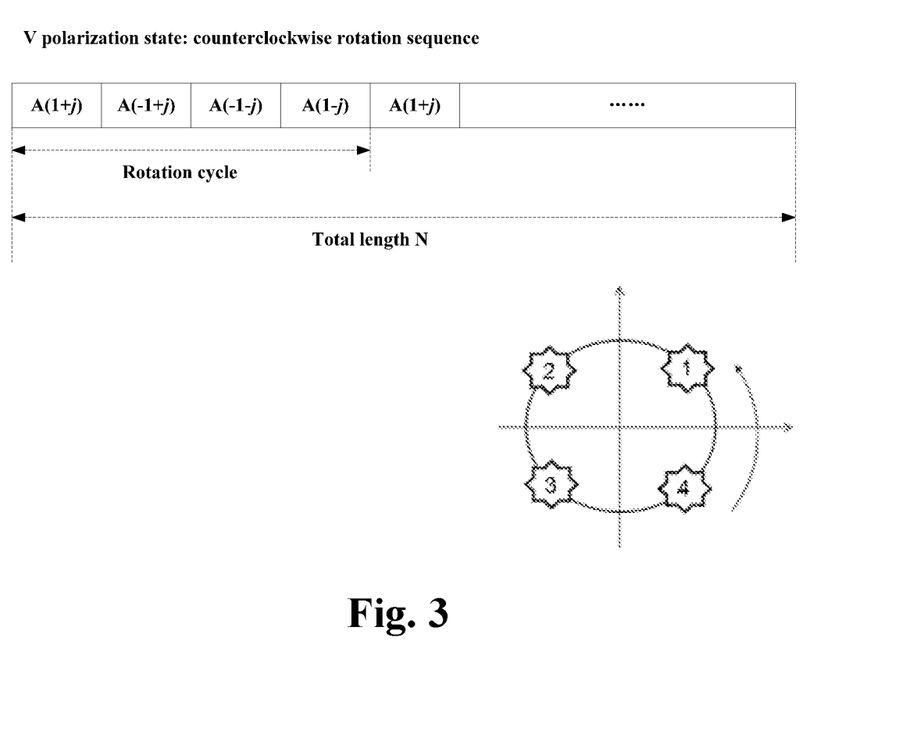
FIG. 3 is another exemplary diagram of the pilot sequence of Embodiment 1 of this disclosure.

FIG. 2 is an exemplary diagram of the pilot sequence of the embodiment of this disclosure, which is described by taking an H polarization state as an example. FIG. 3 is another exemplary diagram of the pilot sequence of the embodiment of this disclosure, which is described by taking a V polarization state as an example. As shown in FIGS. 2 and 3, a total length of the pilot sequence may be N, i.e. containing N data symbols, and a modulation format of it may be a quadrature phase shift keying (QPSK) format. For a dual-polarization optical transmission system, the H polarization state therein may be designed as a data sequence in which constellation points rotate in a clockwise direction, and as shown in FIG. 2, a rotation cycle is four symbol sequences; and the V polarization state may be designed as a data sequence in which constellation points rotate in a counterclockwise direction, and as shown in FIG. 3, a rotation cycle is also four symbol sequences.

What needs to be accounted for is that a relationship between the clockwise direction of the H polarization state and the counterclockwise direction of the V polarization state is relative, and it also be designed that the H polarization state is counterclockwise and the V polarization state is clockwise. It can be seen that only one type limitation of cyclic rotation is introduced into the pilot sequence in the embodiment of this disclosure, in which freedom is kept for amplitudes of the H polarization state and the V polarization state, thereby facilitating execution of other functions. Therefore, thinking from an angle of flexible application, relatively full design freedom is reserved in the pilot sequence of such a structure.

It should be noted that the pilot sequence of this disclosure is only illustrated in FIGS. 2 and 3. However, this disclosure is not limited thereto; for example, the signals may also be single-polarization signals, and the modulation format may also be other formats, such as 16 QAM (quadrature amplitude modulation), or 64 QAM, etc. A particular structure of the pilot sequence may be determined according to an actual situation.

In step 101, after a whole section of received signal sequence is obtained, preprocessing may be performed on the received signals, such as optionally performing in-phase quadrature (IQ) imbalance compensation, polarization de-multiplexing, and pre-equalization, etc., and thereafter, synchronization and extraction of the pilot sequence may be executed.

In step 102, a phase noise of a pilot sequence in the received signals (i.e. the receiving pilot sequence) may be removed by using a pre-obtained pilot signal (i.e. the known transmitting pilot signal). And the phase noise carried by the receiving pilot sequence may be completely removed, and only a noise in an amplitude direction (which may also be referred to as an amplitude noise) is left, hence, noises may be separated by using spectral characteristics of the noises.

In step 103, after the phase noise is removed, the amplitude noise may be transformed into a frequency domain. As a nonlinear amplitude noise (such as an XPM amplitude noise) may be neglected near a pilot frequency, noises near the pilot frequency are mainly linear amplitude noises (such as ASE amplitude noises), hence, noises (such as ASE noises) may be separated within a predetermined frequency range.

In step 104, after the linear noises (such as ASE noises) are separated, power of linear noises (such as ASE noises) carried by the received signals may be obtained on the assumption that power spectral densities of the linear noises (such as ASE noises) are constant, so as to perform monitoring on the linear noises (such as ASE noises). Furthermore, the power of the linear noises (such as ASE noises) may be deducted from the total noise power, so as to obtain power of nonlinear noises (such as XPM noises) carried by the received signals.

Further description is given below taking ASE noises and XPM noises as examples. Furthermore, in order to ensure precision of the noise monitoring and reduce influence of non-ideal factors on estimation values, functions and configuration of the steps shall be described below, respectively.

Figure 4:
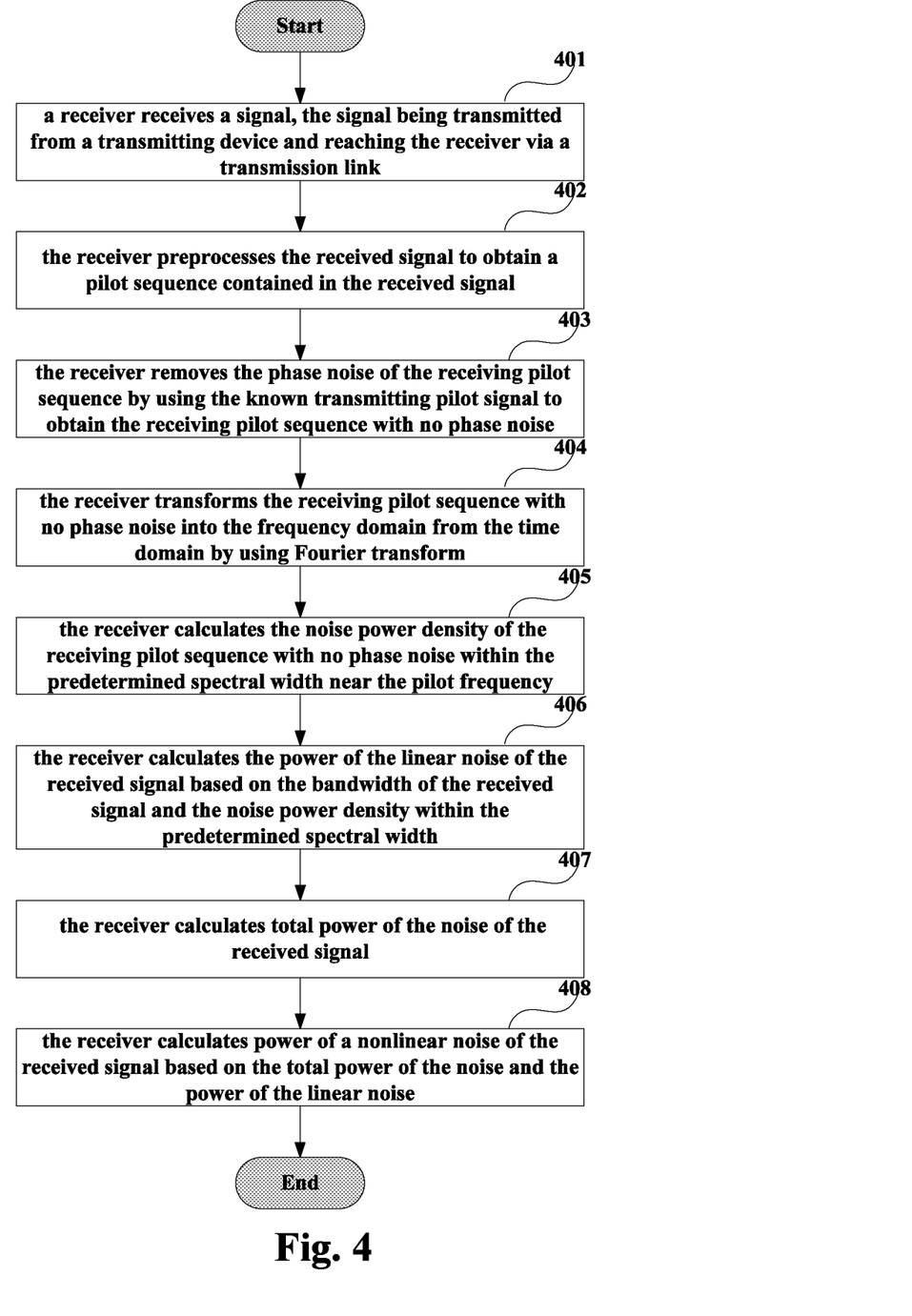
FIG. 4 is another flowchart of the detection method for noise intensity of Embodiment 1 of this disclosure.

FIG. 4 is another flowchart of the detection method for noise intensity of the embodiment of this disclosure. As shown in FIG. 4, the detection method for noise intensity includes:

Step 401: a receiver receives a signal; the signal being transmitted from a transmitting device and reaching the receiver via a transmission link;

in this embodiment, after obtaining the received signal, the receiver may perform conversion from an optical signal to an electrical signal and various signal processing, and the relevant art may be referred to for details techniques.

Step 402: the receiver preprocesses the received signal to obtain a pilot sequence contained in the received signal;

in this embodiment, the receiver may perform one or more of the following processing: IQ imbalance cancellation, frequency offset compensation, polarization de-multiplexing and pre-equalization; and after performing the above operations, it performs synchronization on the pilot sequence.

Figure 5:
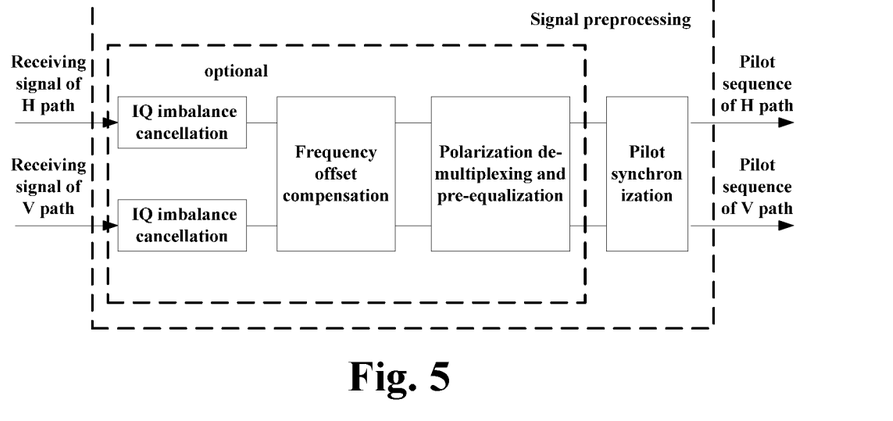
FIG. 5 is a schematic diagram of preprocessing a received signal of Embodiment 1 of this disclosure.

FIG. 5 is a schematic diagram of preprocessing the received signal of the embodiment of this disclosure, which is described by taking a dual-polarization system as an example; as shown in FIG. 5, the received signals of the coherent receiver are signals of H and V paths, and IQ imbalance cancellation, frequency offset compensation, polarization de-multiplexing and pre-equalization may be performed in succession in the coherent optical receiver; it should be noted that what described above is illustrative only, and one or more of the operations may be performed, or pilot synchronization is performed directly, without performing the above operations.

As shown in FIG. 5, pilot synchronization may be performed on the signals of H and V paths after being performed various processing, and the relevant art may be referred to for how to perform the pilot synchronization; for example, the pilot synchronization may be achieved by using any existing related pilot synchronization algorithm.

Step 403: the receiver removes the phase noise of the receiving pilot sequence by using the known transmitting pilot signal to obtain the receiving pilot sequence with no phase noise;

in this embodiment, the pilot signal may be an original pilot sequence adopted by the transmitting device, and may be pre-obtained from the transmitting device; the phase noise of the pilot sequence may be obtained symbol by symbol by using the transmitting pilot signal and the receiving pilot sequence; and the phase noise may be removed from the receiving pilot sequence.

Figure 6:
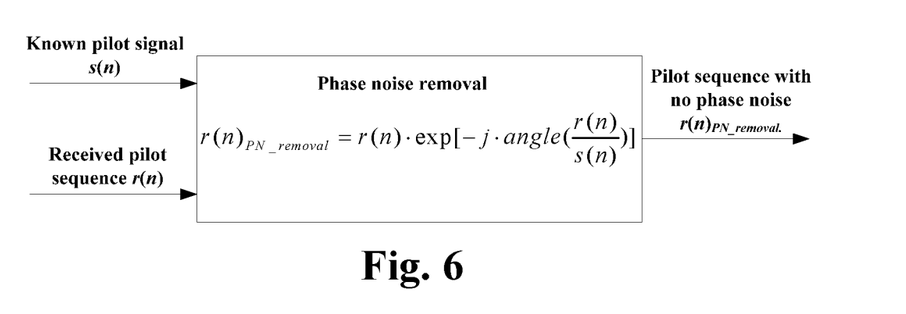
FIG. 6 is a schematic diagram of removing a phase noise of Embodiment 1 of this disclosure.

FIG. 6 is a schematic diagram of removing the phase noise of the embodiment of this disclosure; as shown in FIG. 6, angle[r(n)/s(n)] may be calculated first by using the known transmitting pilot signal s(n) and the obtained receiving pilot sequence r(n), so as to obtain the phase noise of the receiving pilot sequence, and then the phase noise is removed from receiving pilot sequence r(n), so as to finally obtain the receiving pilot sequence $r(n)_{PN\_removal}$ with no phase noise;

that is, the phase noise removal may be performed by using the following formula:

$$r(n)_{PN\_removal} = r(n) \cdot \exp\left[-j \cdot \text{angle}\left(\frac{r(n)}{s(n)}\right)\right];$$

where, r(n) is the receiving pilot sequence, $r(n)_{PN\_removal}$ is the receiving pilot sequence with no phase noise, s(n) is the transmitting pilot signal, and $$\text{angle}\left(\frac{r(n)}{s(n)}\right)$$

denotes a phase angle between the receiving pilot sequence and the transmitting pilot signal;

after such processing, the phase noise carried by the pilot sequence may be completely removed, and noises in the amplitude direction are only left.

Step 404: the receiver transforms the receiving pilot sequence with no phase noise into the frequency domain from the time domain by using Fourier transform;

in this embodiment, fast Fourier transform (FFT) may be used.

Step 405: the receiver calculates the noise power density of the receiving pilot sequence with no phase noise within the predetermined spectral width near the pilot frequency.

Figure 7:
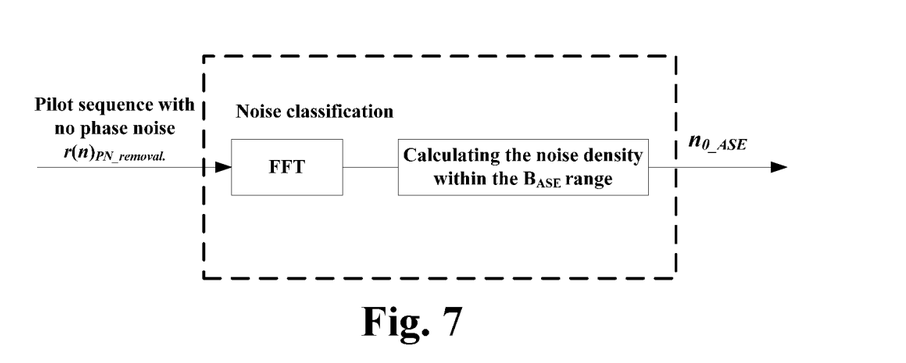
FIG. 7 is a schematic diagram of noise classification of Embodiment 1 of this disclosure.

FIG. 7 is a schematic diagram of noise classification of the embodiment of this disclosure; as shown in FIG. 7, FFT may be performed on the receiving pilot sequence with no phase noise, and then the noise power density within the predetermined spectral width near the pilot frequency may be calculated; the pilot frequency may be pre-determined, and the predetermined spectral width may be marked by $B_{ASE}$, and may also be pre-determined (such as by using an empirical value).

Figure 8:
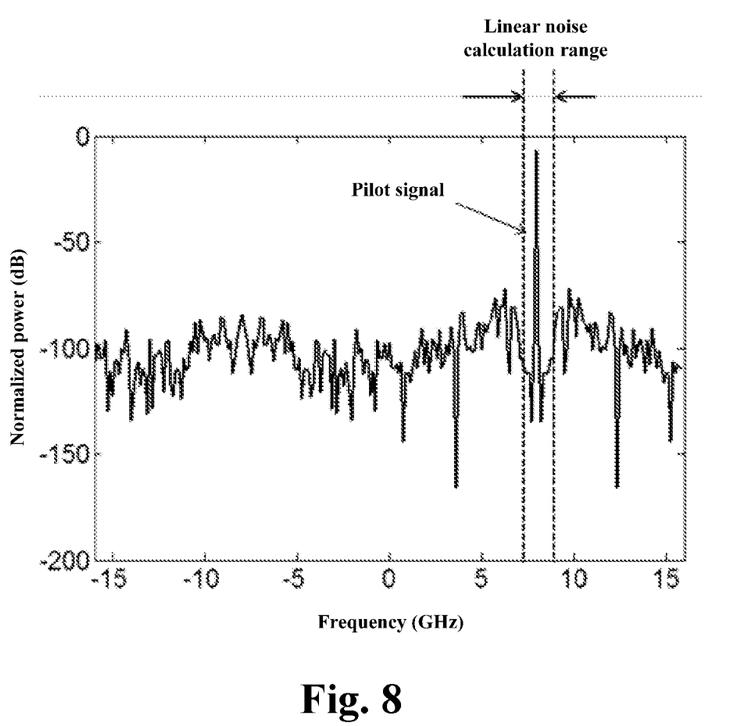
FIG. 8 is an exemplary diagram of a spectrum of the pilot sequence with no phase noise of Embodiment 1 of this disclosure.

FIG. 8 is an exemplary diagram of a spectrum of the pilot sequence with no phase noise of the embodiment of this disclosure; as shown in FIG. 8, as the XPM noises will be removed in the frequency region near the pilot frequency, a spectral recess will occur within a frequency range that the pilot frequency is near, and such a recess may be deemed as containing ASE noises only, hence, a spectral power density of this region may be deemed as an ASE noise power spectral density;

hence, after the FFT is performed, the noise power density may be calculated within the predetermined spectral width $B_{ASE}$ near the pilot frequency, which is denoted by $n_{0\_ASE}$; the relevant art may be referred to for how to calculate the noise power and the noise power density, and any existing related method may be used.

Step 406: the receiver calculates the power of the linear noise of the received signal based on the bandwidth of the received signal and the noise power density within the predetermined spectral width;

in this embodiment, the linear noise (such as an ASE noise) may be deemed as an additive Gaussian white noise, and its power spectral density may be deemed as being identical within the whole spectral range; hence, the power of the ASE noise may be calculated by using the following formula:

$$P_{ASE}=n_{0\_ASE}\cdot BW;$$

where, $P_{ASE}$ is the power of the amplified spontaneous emission noise of the received signal, $n_{0\_ASE}$ is the noise power density within the predetermined spectral width, and BW is the bandwidth of the received signal, which may be predetermined.

Step 407: the receiver calculates total power of the noise of the received signal; and Step 408: the receiver calculates power of a nonlinear noise of the received signal based on the total power of the noise and the power of the linear noise; in this embodiment, the total power $P_{total}$ of the noise carried by the received signal (such as the receiving pilot sequence) may be calculated, and may be obtained by calculating the total power of the noise of the spectrum shown in FIG. 8; and then the XPM noise power $P_{XPM}$ is obtained by deducting the power of the ASE noise from the total power of the noise;

that is, the XPM noise power may be calculated by using the following formula:

$$P_{XPM}=P_{total}-P_{ASE};$$

where, $P_{ASE}$ is the power of the amplified spontaneous emission noise of the received signal, $P_{XPM}$ is the power of the cross phase modulation noise of the received signal, and $P_{total}$ the total power of the noise of the received signal.

Thus, the power of the ASE noise and the XPM noise power may be calculated respectively, thereby achieving a goal of monitoring.

It should be noted that the embodiment of this disclosure is only illustrated in the above drawings. However, this disclosure is not limited thereto. For example, an order of execution of the steps may appropriately adjusted, and furthermore, some other steps may be added or some of these steps may be omitted. Suitable variants may be made by those skilled in the art, without being limited to what is contained in the above drawings.

It can be seen from the above embodiment that in a transmitting device, a pilot sequence is added into the transmission signal; in a receiving device, a phase noise of the pilot sequence in the received signal is removed, a noise power density of the pilot sequence with no phase noise within a predetermined spectral width near a pilot frequency is calculated, and power of a linear noise of the received signal is calculated based on a bandwidth of the received signal and the noise power density. Hence, linear noises and nonlinear noises may be split efficiently without introducing much complexity, and information on intensities of various noises may be obtained.

Embodiment 2

The embodiment of this disclosure provides a detection apparatus for noise intensity, configured in a coherent optical receiver. Contents in this embodiment identical to those in Embodiment 1 shall not be described herein any further.

Figure 9:
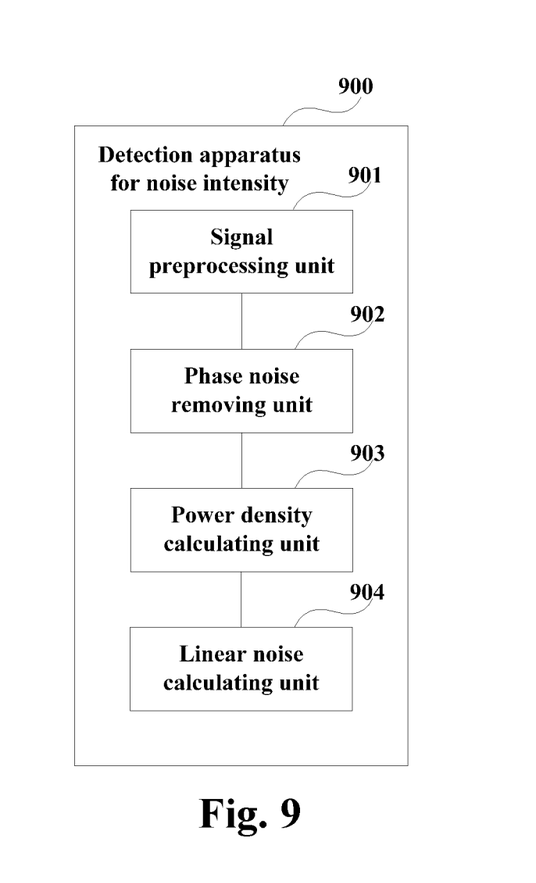
FIG. 9 is a schematic diagram of the detection apparatus for noise intensity of Embodiment 2 of this disclosure.

FIG. 9 is a schematic diagram of the detection apparatus for noise intensity of the embodiment of this disclosure. As shown in FIG. 9, the detection apparatus 900 for noise intensity includes:

a signal preprocessing unit 901 configured to preprocess a received signal to obtain a pilot sequence contained in the received signal;

a phase noise removing unit 902 configured to remove a phase noise of a receiving pilot sequence by using a known transmitting pilot signal;

a power density calculating unit 903 configured to calculate a noise power density of the receiving pilot sequence with no phase noise within a predetermined spectral width near a pilot frequency; and a linear noise calculating unit 904 configured to calculate power of a linear noise of the received signal based on a bandwidth of the received signal and the noise power density within the predetermined spectral width.

Figure 10:
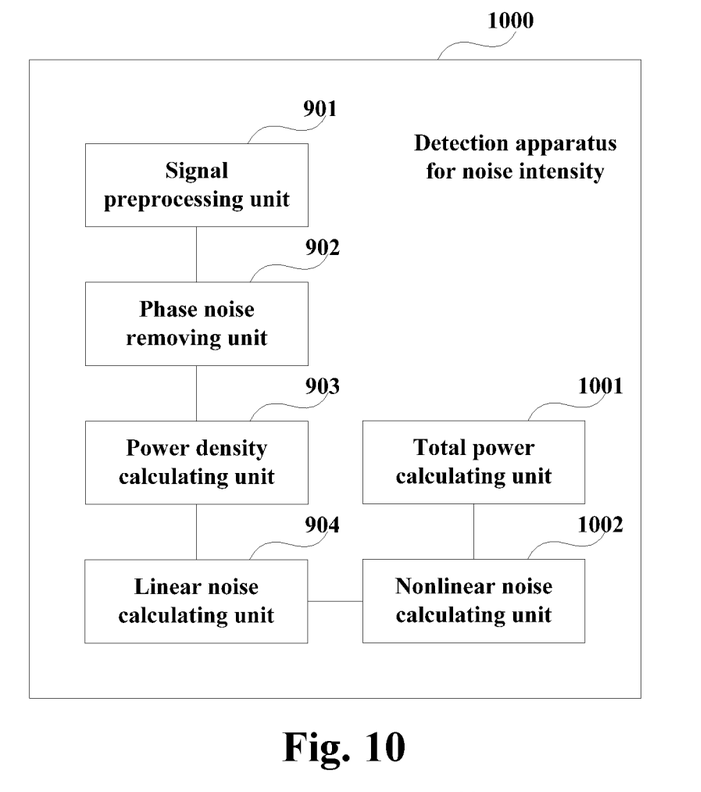
FIG. 10 is another schematic diagram of the detection apparatus for noise intensity of Embodiment 2 of this disclosure.

FIG. 10 is another schematic diagram of the detection apparatus for noise intensity of the embodiment of this disclosure. As shown in FIG. 10, the detection apparatus 1000 for noise intensity includes: a signal preprocessing unit 901, a phase noise removing unit 902, a power density calculating unit 903 and a linear noise calculating unit 904, as described above.

As shown in FIG. 10, the detection apparatus 1000 for noise intensity may further include:

a total power calculating unit 1001 configured to calculate total power of the noise of the received signal; and a nonlinear noise calculating unit 1002 configured to calculate power of a nonlinear noise of the received signal based on the total power of the noise and the power of the linear noise.

In this embodiment, the linear noise may be an ASE noise, and the nonlinear noise may be an XPM noise.

In this embodiment, the phase noise removing unit 902 may particularly be configured to: obtain the phase noise of the receiving pilot sequence symbol by symbol by using the transmitting pilot signal and the receiving pilot sequence, and remove the phase noise from the receiving pilot sequence.

That is, the phase noise removing unit 902 may perform the phase noise removal by using the following formula:

$$r(n)_{PN\_removal} = r(n) \cdot \exp\left[-j \cdot \text{angle}\left(\frac{r(n)}{s(n)}\right)\right];$$

where, r(n) is the receiving pilot sequence, $r(n)_{PN\_removal}$ is the receiving pilot sequence with no phase noise, s(n) is the transmitting pilot signal, and $$\text{angle}\left(\frac{r(n)}{s(n)}\right)$$

denotes a phase angle between the receiving pilot sequence and the transmitting pilot signal.

In this embodiment, power density calculating unit 903 may further be configured to: transform the receiving pilot sequence with no phase noise into the frequency domain from the time domain by using Fourier transform.

In this embodiment, the linear noise calculating unit 904 may calculate power of the ASE noise by using the following formula:

$$P_{ASE} = n_{0\_ASE} \cdot BW;$$

where, $P_{ASE}$ is the power of the amplified spontaneous emission noise of the received signal, $n_{0\_ASE}$ is the noise power density within the predetermined spectral width, and BW is the bandwidth of the received signal.

And the nonlinear noise calculating unit 1002 may be configured to calculate power of the XPM noise by using the following formula:

$$P_{XPM} = P_{total} - P_{ASE};$$

where, $P_{ASE}$ is the power of the amplified spontaneous emission noise of the received signal, $P_{XPM}$ is the power of the cross phase modulation noise of the received signal, and $P_{total}$ is the total power of the noise of the received signal.

In this embodiment, the signal preprocessing unit 901 may particularly be configured to: perform one or more of the following processing on the received signals: IQ imbalance cancellation, frequency offset compensation, polarization de-multiplexing and pre-equalization, and perform synchronization on the pilot sequence.

It can be seen from the above embodiment that in a transmitting device, a pilot sequence is added into the transmission signal; in a receiving device, a phase noise of the pilot sequence in the received signal is removed, a noise power density of the pilot sequence with no phase noise within a predetermined spectral width near a pilot frequency is calculated, and power of a linear noise of the received signal is calculated based on a bandwidth of the received signal and the noise power density. Hence, linear noises and nonlinear noises may be split efficiently without introducing much complexity, and information on intensities of various noises may be obtained.

Embodiment 3

The embodiment of this disclosure provides a coherent optical receiver, which may be configured with the detection apparatus 900 or 1000 for noise intensity described in Embodiment 2. Contents in this embodiment identical to those in embodiments 1 and 2 shall not be described herein any further.

Figure 11:
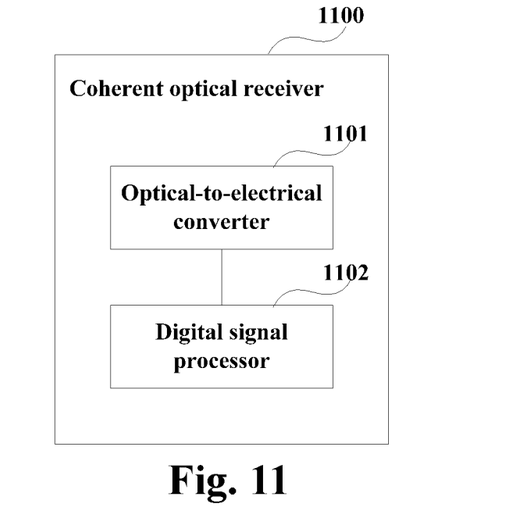
FIG. 11 is a schematic diagram of the coherent optical receiver of Embodiment 3 of this disclosure.

FIG. 11 is a schematic diagram of the coherent optical receiver of the embodiment of this disclosure. As shown in FIG. 11, the coherent optical receiver 1100 may include:

an optical-to-electrical converter 1101 configured to convert a received optical signal into an electrical signal; and a digital signal processor 1102 configured to preprocess the electrical signal to obtain a pilot sequence contained in the electrical signal, remove a phase noise of a receiving pilot sequence by using a known transmitting pilot signal, calculate a noise power density of the receiving pilot sequence with no phase noise within a predetermined spectral width near a pilot frequency, and calculate power of a linear noise of the received signal based on a bandwidth of the received signal and the noise power density within the predetermined spectral width.

In this embodiment, the digital signal processor 1102 may execute the above functions/operations by using the DSP technique. It should be note that FIG. 11 only shows components related to this disclosure; however, this disclosure is not limited thereto. The relevant art may be referred to for other parts of the coherent optical receiver, which shall not be described herein any further.

Figure 12:
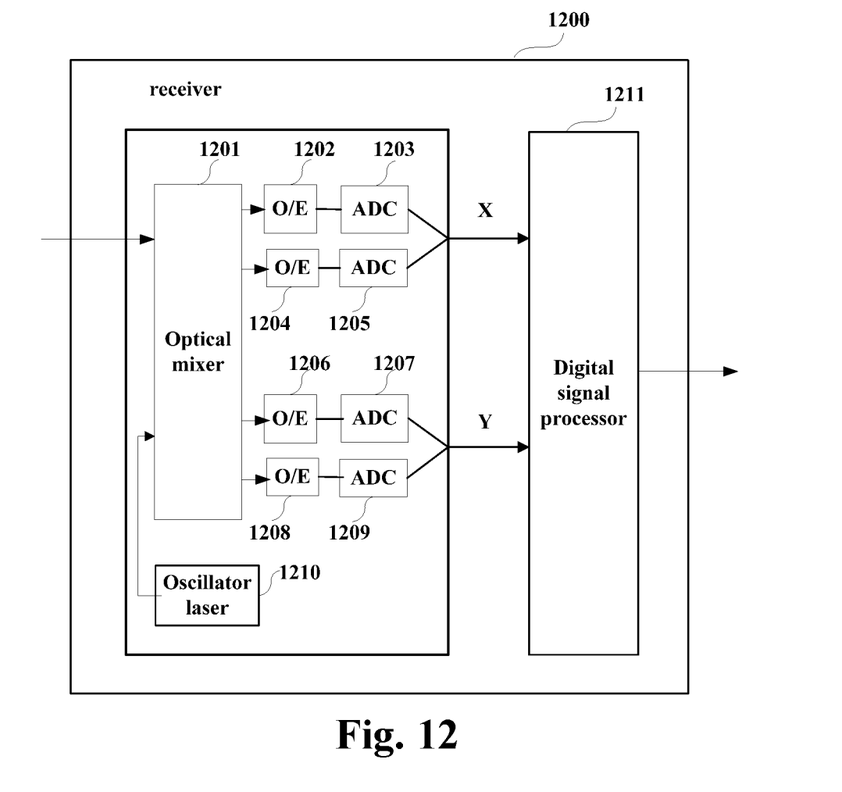
FIG. 12 is another schematic diagram of the coherent optical receiver of Embodiment 3 of this disclosure.

FIG. 12 is another schematic diagram of the coherent optical receiver of the embodiment of this disclosure, which is described by taking dual polarization states as examples. As shown in FIG. 12, the receiver 1200 includes an oscillator laser 1210, an optical mixer 1201, opto-electronic (O/E) detectors 1202, 1204, 1206 and 1208, analog-to-digital converters (ADCs) 1203, 1205, 1207 and 1209, and a digital signal processor 1211.

The digital signal processor 1211 may execute the function of the digital signal processor 1102, that is, it may be controlled to carry out the detection method for noise intensity described in Embodiment 1, which shall not be described herein any further.

The oscillator laser 1210 is configured to provide a local light source; an optical signal is converted into a baseband signal in one polarization state after passing through the optical mixer 1201 and the analog-to-digital converters (ADCs) 1203 and 1205; and the optical signal is converted into a baseband signal in the other polarization state after passing through the optical mixer 1201, the opto-electronic (O/E) 1206 and 1208 and the analog-to-digital converters (ADCs) 1207 and 1209, with a detailed process being similar to that in the relevant art, and being not going to be described herein any further.

Furthermore, the receiver 1200 may include a dispersion compensator and an equalizer (not shown). If a frequency difference and a phase noise have effect on estimation of an optical signal to noise ratio (OSNR), the receiver 1200 may further include a frequency difference compensator and a phase noise compensator (not shown).

It should be noted that the structure of the receiver shown in FIG. 12 is illustrative only. However, this disclosure is not limited thereto, and the receiver 1200 does not necessarily include all the parts shown in FIG. 12; and furthermore, the receiver 1200 may include parts not shown in FIG. 12, and the relevant art may be referred to.

The embodiment of this disclosure further provides an optical communications system.

Figure 13:
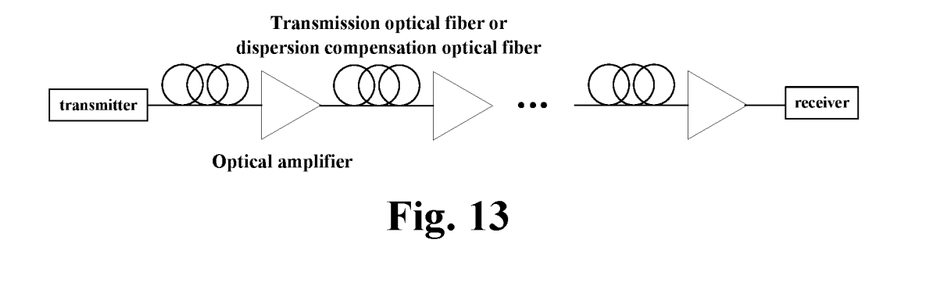
FIG. 13 is a schematic diagram of the optical communications system of Embodiment 3 of this disclosure.

FIG. 13 is a schematic diagram of the optical communications system of the embodiment of this disclosure. As shown in FIG. 13, signals transmitted by a transmitter may reach a receiver after passing through different devices (such as an optical fiber, an optical amplifier, and a dispersion compensation optical fiber, etc.) in a transmission link. The transmitter may add a pilot sequence into the transmission signal, and the receiver may include the digital signal processor 1102 described above.

The above apparatuses and methods of the present disclosure may be implemented by hardware, or by hardware in combination with software. The present disclosure relates to such a computer-readable program that may be stored on a non-transitory computer readable storage medium and that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 9 (such as the signal preprocessing unit, and the phase noise removing unit, etc.) may either correspond to software modules of procedures of a computer program, or correspond to hardware modules. Such software modules may respectively correspond to the steps shown in FIG. 1. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in Figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams shown in the drawings may also be realized as a combination of computing equipment, such as a combination of a DSP and a microprocessor, multiple processors, one or more microprocessors in communications combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of the present disclosure containing the above embodiments, following supplements are further disclosed.

Supplement 1. A detection method for noise intensity, applicable to a coherent optical receiver, characterized in that the detection method includes:

preprocessing a received signal to obtain a pilot sequence contained in the received signal;

removing a phase noise of a receiving pilot sequence by using a known transmitting pilot signal;

calculating a noise power density of the receiving pilot sequence with no phase noise within a predetermined spectral width near a pilot frequency; and calculating power of a linear noise of the received signal based on a bandwidth of the received signal and the noise power density within the predetermined spectral width.

Supplement 2. The detection method according to supplement 1, wherein the detection method further includes:

calculating total power of the noise of the received signal; and calculating power of a nonlinear noise of the received signal based on the total power of the noise and the power of the linear noise.

Supplement 3. The detection method according to supplement 2, wherein the linear noise is an amplified spontaneous emission noise, and the nonlinear noise is a cross phase modulation noise.

Supplement 4. The detection method according to supplement 1, wherein the removing a phase noise of a receiving pilot sequence by using a known transmitting pilot signal includes:

obtaining the phase noise of the receiving pilot sequence symbol by symbol by using the transmitting pilot signal and the receiving pilot sequence; and removing the phase noise from the receiving pilot sequence.

Supplement 5. The detection method according to supplement 4, wherein the phase noise removal is performed by using the following formula:

$$r(n)_{PN\_removal} = r(n) \cdot \exp\left[-j \cdot \text{angle}\left(\frac{r(n)}{s(n)}\right)\right];$$

where, $r(n)$ is the receiving pilot sequence, $r(n)_{PN\_removal}$ removal is the receiving pilot sequence with no phase noise, $s(n)$ is the transmitting pilot signal, and $$\text{angle}\left(\frac{r(n)}{s(n)}\right)$$

denotes a phase angle between the receiving pilot sequence and the transmitting pilot signal.

Supplement 6. The detection method according to supplement 1, wherein before calculating the noise power density of the receiving pilot sequence with no phase noise within the predetermined spectral width near the pilot frequency, the detection method further includes:

transforming the receiving pilot sequence with no phase noise into the frequency domain from the time domain by using Fourier transform.

Supplement 7. The detection method according to supplement 3, wherein the following formula is used in calculating the power of the linear noise of the received signal based on the bandwidth of the received signal and the noise power density within the predetermined spectral width:

$$P_{ASE} = n_{0\_ASE} \cdot BW;$$

where, $P_{ASE}$ is the power of the amplified spontaneous emission noise of the received signal, $n_{0\_ASE}$ is the noise power density within the predetermined spectral width, and BW is the bandwidth of the received signal.

Supplement 8. The detection method according to supplement 3, wherein the following formula is used in calculating the power of the nonlinear noise of the received signal based on the total power of the noise and the power of the linear noise:

$$P_{XPM} = P_{total} - P_{ASE};$$

where, $P_{ASE}$ is the power of the amplified spontaneous emission noise of the received signal, $P_{XPM}$ is the power of the cross phase modulation noise of the received signal, and $P_{total}$ is the total power of the noise of the received signal.

Supplement 9. The detection method according to supplement 1, wherein the preprocessing a received signal to obtain a pilot sequence contained in the received signal includes:

performing one or more of the following processing: IQ imbalance cancellation, frequency offset compensation, polarization de-multiplexing and pre-equalization; and performing synchronization on the pilot sequence.

Supplement 10. A detection apparatus for noise intensity, configured in a coherent optical receiver, characterized in that the detection apparatus includes:

a signal preprocessing unit configured to preprocess a received signal to obtain a pilot sequence contained in the received signal;

a phase noise removing unit configured to remove a phase noise of a receiving pilot sequence by using a known transmitting pilot signal;

a power density calculating unit configured to calculate a noise power density of the receiving pilot sequence with no phase noise within a predetermined spectral width near a pilot frequency; and a linear noise calculating unit configured to calculate power of a linear noise of the received signal based on a bandwidth of the received signal and the noise power density within the predetermined spectral width.

Supplement 11. The detection apparatus according to supplement 10, wherein the detection apparatus further includes:

a total power calculating unit configured to calculate total power of the noise of the received signal; and a nonlinear noise calculating unit configured to calculate power of a nonlinear noise of the received signal based on the total power of the noise and the power of the linear noise.

Supplement 12. The detection apparatus according to supplement 11, wherein the linear noise is an amplified spontaneous emission noise, and the nonlinear noise is a cross phase modulation noise.

Supplement 13. The detection apparatus according to supplement 10, wherein the phase noise removing unit is configured to: obtain the phase noise of the receiving pilot sequence symbol by symbol by using the transmitting pilot signal and the receiving pilot sequence, and remove the phase noise from the receiving pilot sequence.

Supplement 14. The detection apparatus according to supplement 13, wherein the phase noise removing unit performs the phase noise removal by using the following formula:

$$r(n)_{PN\_removal} = r(n) \cdot \exp\left[-j \cdot \mathrm{angle}\left(\frac{r(n)}{s(n)}\right)\right];$$

where, $r(n)$ is the receiving pilot sequence, $r(n)_{PN\_removal}$ is the receiving pilot sequence with no phase noise, $s(n)$ is the transmitting pilot signal, and $$\mathrm{angle}\left(\frac{r(n)}{s(n)}\right)$$

denotes a phase angle between the receiving pilot sequence and the transmitting pilot signal.

Supplement 15. The detection apparatus according to supplement 10, wherein the power density calculating unit is further configured to: transform the receiving pilot sequence with no phase noise into the frequency domain from the time domain by using Fourier transform.

Supplement 16. The detection apparatus according to supplement 12, wherein the linear noise calculating unit calculates the power of the amplified spontaneous emission noise by using the following formula:

$$P_{ASE} = n_{0\_ASE} \cdot BW;$$

where, $P_{ASE}$ is the power of the amplified spontaneous emission noise of the received signal, $n_{0\_ASE}$ is the noise power density within the predetermined spectral width, and BW is the bandwidth of the received signal.

Supplement 17. The detection apparatus according to supplement 12, wherein the nonlinear noise calculating unit calculates the power of the cross phase modulation noise by using the following formula:

$$P_{XPM} = P_{total} - P_{ASE};$$

where, $P_{ASE}$ is the power of the amplified spontaneous emission noise of the received signal, $P_{XPM}$ is the power of the cross phase modulation noise of the received signal, and $P_{total}$ is the total power of the noise of the received signal.

Supplement 18. The detection apparatus according to supplement 10, wherein the signal preprocessing unit is configured to: perform one or more of the following processing: IQ imbalance cancellation, frequency offset compensation, polarization de-multiplexing and pre-equalization, and perform synchronization on the pilot sequence.

Supplement 19. A coherent optical receiver, including:

an optical-to-electrical converter configured to convert a received optical signal into an electrical signal; and a digital signal processor configured to preprocess the electrical signal to obtain a pilot sequence contained in the electrical signal, remove a phase noise of a receiving pilot sequence by using a known transmitting pilot signal, calculate a noise power density of the receiving pilot sequence with no phase noise within a predetermined spectral width near a pilot frequency, and calculate power of a linear noise of the received signal based on a bandwidth of the received signal and the noise power density within the predetermined spectral width.

Supplement 20. The detection apparatus according to supplement 19, wherein the digital signal processor is further configured to: calculate total power of the noise of the received signal, and calculate power of a nonlinear noise of the received signal based on the total power of the noise and the power of the linear noise.

What is claimed is:

1. A detection apparatus for noise intensity, configured in a coherent optical receiver, the detection apparatus comprising:
   a digital signal processor
      configured to preprocess a received signal to obtain a pilot sequence contained in the received signal;
      remove a phase noise of a receiving pilot sequence by using a known transmitting pilot signal;
      calculate a noise power density of the receiving pilot sequence without phase noise within a predetermined spectral width near a pilot frequency; and
      calculate power of a linear noise of the received signal based on a bandwidth of the received signal and the noise power density within the predetermined spectral width,
   the digital signal processor further configured to:
      calculate total power of received signal noise of the received signal, and
      calculate power of a nonlinear noise of the received signal based on the total power of the received signal noise and the power of the linear noise.

2. The detection apparatus according to claim 1, wherein the linear noise comprises amplified spontaneous emission (ASE) noise, and the nonlinear noise comprises cross phase modulation (XPM) noise.

3. The detection apparatus according to claim 2, wherein the digital signal processor is configured to calculate power of the amplified spontaneous emission noise using:

$$P_{ASE} = n_{0\_ASE} \cdot BW;$$

where, $P_{ASE}$ is the power of the amplified spontaneous emission noise of the received signal, $n_{0\_ASE}$ is the noise power density within the predetermined spectral width, and BW is the bandwidth of the received signal.

4. The detection apparatus according to claim 2, wherein the digital signal processor is configured to calculate power of the cross phase modulation noise using:

$$P_{XPM} = P_{total} - P_{ASE};$$

where, $P_{ASE}$ is the power of the amplified spontaneous emission noise of the received signal, $P_{XPM}$ is the power of the cross phase modulation noise of the received signal, and $P_{total}$ is the total power of the noise of the received signal.

5. The detection apparatus according to claim 1, wherein the digital signal processor is configured to:
   obtain the phase noise of the receiving pilot sequence symbol by symbol by using the transmitting pilot signal and the receiving pilot sequence, and
   remove the phase noise from the receiving pilot sequence.

6. The detection apparatus according to claim 5, wherein the digital signal processor is configured to perform the phase noise removal using:

$$r(n)_{PN\_removal} = r(n) \cdot \exp\left[-j \cdot \text{angle}\left(\frac{r(n)}{s(n)}\right)\right];$$

where, $r(n)$ is the receiving pilot sequence, $r(n)_{PN\_removal}$ is the receiving pilot sequence with no phase noise, $s(n)$ is the transmitting pilot signal, and $$\text{angle}\left(\frac{r(n)}{s(n)}\right)$$

denotes a phase angle between the receiving pilot sequence and the transmitting pilot signal.

7. The detection apparatus according to claim 1, wherein the linear noise is used for one of failure diagnosis and system positioning.

8. A detection method for noise intensity, applicable to a coherent optical receiver, the detection method comprising:
   preprocessing a received signal to obtain a pilot sequence contained in a received signal;
   removing a phase noise of a receiving pilot sequence by using a known transmitting pilot signal;
   calculating a noise power density of the receiving pilot sequence without phase noise within a predetermined spectral width near a pilot frequency; and
   calculating power of a linear noise of the received signal based on a bandwidth of the received signal and the noise power density within the predetermined spectral width,
   the detection method further comprising:
   calculate total power of received signal noise of the received signal; and
   calculate power of a nonlinear noise of the received signal based on the total power of the received signal noise and the power of the linear noise.

9. The detection method according to claim 8, wherein the detection method further comprises:
   calculating total power of received signal noise of the received signal; and
   calculating power of a nonlinear noise of the received signal based on the total power of the received signal noise and the power of the linear noise.

10. A non-transitory computer readable storage medium storing a method according to claim 8.

11. A coherent optical receiver, comprising:
    an optical-to-electrical converter configured to convert a received optical signal into an electrical signal; and
    a digital signal processor configured to preprocess the electrical signal to obtain a pilot sequence contained in the electrical signal, remove a phase noise of a receiving pilot sequence by using a known transmitting pilot signal, calculate a noise power density of the receiving pilot sequence without phase noise within a predetermined spectral width near a pilot frequency, calculate power of a linear noise of the received signal based on a bandwidth of the received signal and the noise power density within the predetermined spectral width, calculate total power of received signal noise of the received signal, and calculate power of a nonlinear noise of the received signal based on the total power of the received signal noise and the power of the linear noise.

12. A coherent optical receiver method, comprising:
    converting a received optical signal into an electrical signal;

preprocessing the electrical signal to obtain a pilot sequence contained in the electrical signal;

removing a phase noise of a receiving pilot sequence by using a known transmitting pilot signal;

calculating a noise power density of the receiving pilot sequence without phase noise within a predetermined spectral width near a pilot frequency; and calculating power of a linear noise of the received signal based on a bandwidth of the received signal and the noise power density within the predetermined spectral width the coherent optical receiver method further comprising:

calculate total power of received signal noise of the received signal; and calculate power of a nonlinear noise of the received signal based on the total power of the received signal noise and the power of the linear noise.

13. A detection apparatus for noise intensity, configured in a coherent optical receiver, the detection apparatus comprising:

a signal preprocessor configured to preprocess a received signal to obtain a pilot sequence contained in the received signal;

a phase noise remover configured to remove a phase noise of a receiving pilot sequence by using a known transmitting pilot signal;

a power density calculator configured to calculate a noise power density of the receiving pilot sequence without phase noise within a predetermined spectral width near a pilot frequency;

a linear noise calculator configured to calculate power of a linear noise of the received signal based on a bandwidth of the received signal and the noise power density within the predetermined spectral width;

a total power calculator configured to calculate total power of received signal noise of the received signal; and a nonlinear noise calculator configured to calculate power of a nonlinear noise of the received signal based on the total power of the received signal noise and the power of the linear noise.

* * * * *